United States Patent [19]

Watanabe et al.

[11] Patent Number: 4,717,595
[45] Date of Patent: Jan. 5, 1988

[54] MOLDED CARBONACEOUS MATERIAL

[75] Inventors: Koichi Watanabe; Michinobu Maesaka; Michihiro Murata, all of Kyoto, Japan

[73] Assignee: Murata Manufacturing Co., Ltd., Japan

[21] Appl. No.: 931,911

[22] Filed: Nov. 17, 1986

Related U.S. Application Data

[63] Continuation of Ser. No. 770,067, Aug. 28, 1985, abandoned.

[30] Foreign Application Priority Data

Aug. 31, 1984 [JP] Japan .................. 59-183202

[51] Int. Cl.⁴ .............................................. B05D 7/00
[52] U.S. Cl. .................................. 427/221; 252/511; 427/79; 428/407; 429/42; 429/217; 523/205; 523/215
[58] Field of Search ............... 523/215, 205; 252/511; 524/496, 563, 495; 106/307; 427/221; 428/407

[56] References Cited

U.S. PATENT DOCUMENTS

| | | | |
|---|---|---|---|
| 3,969,124 | 7/1976 | Stewart | 264/29 |
| 3,976,055 | 8/1976 | Monter et al. | 252/511 X |
| 4,233,191 | 11/1980 | Reuter et al. | 252/511 |
| 4,374,941 | 2/1983 | Sandstrom | 523/206 |
| 4,551,267 | 11/1985 | Fushimi et al. | 252/511 |

FOREIGN PATENT DOCUMENTS 1121474  7/1968  United Kingdom .
1144325  3/1969  United Kingdom .

*Primary Examiner*—Theodore E. Pertilla
*Attorney, Agent, or Firm*—Ostrolenk, Faber, Gerb & Soffen

[57] ABSTRACT

A molded carbonaceous material which is a molded mixture comprising a carbonaceous powder and a binder, particles of said carbonaceous powder particles being bound together by means of said binder with the surface of said carbonaceous powder being not wholly covered with said binder.

13 Claims, 2 Drawing Figures

MOLDED CARBONACEOUS MATERIAL

This is a continuation of application Ser. No. 770,067 filed Aug. 28, 1985 and now abandoned.

FIELD OF THE INVENTION

This invention relates to a shaped or molded carbonaceous material which is, a molded mixture comprising a carbonaceous powder and a binder.

BACKGROUND OF THE INVENTION

Molded carbonaceous materials are used as deodorants, decoloring agents, adsorbents, catalyst carriers, conductive electrodes, and polarized electrodes in electric double layer capacitors, among others.

So far known molded carbonaceous materials are as follows:

One example is the one produced by mixing a carbonaceous powder, such as active carbon, graphite, or carbon black, with glass frit, molding the mixture, heating the same to thereby melt the glass frit and cooling the same for solidification.

Another example is the one produced by mixing a carbonaceous powder such as mentioned above with tar, pitch, a binder and a solvent, and molding the mixture.

A further example is the one obtained by mixing active carbon with a binder such as polyvinyl alcohol or polyvinylpyrrolidone.

As for the first and second types of carbonaceous materials, however, the so-called carbonating activation by blowing high temperature steam against the materials is required for providing them with surface activity, since each carbonaceous powder particle 1 is surrounded by glass, tar, pitch and/or the like 2, as shown in FIG. 1.

Carbonaceous materials of the third type are particularly useful as polarized electrodes of electric double layer capacitors. However, they occur as pastes and therefore work is required for the filling of cells with them in the process of cell manufacture. Accordingly, solid polarizable electrodes are rather desirable from the viewpoint of easy handling. For actual use as polarized electrodes, the above mentioned pastes are impregnated with an electrolytic solution such as sulfuric acid.

SUMMARY OF THE INVENTION

Accordingly, it is an object of the present invention to provide a molded carbonaceous material which substantially retains the surface activity of the carbonaceous powder.

The present invention thus provides a molded carbonaceous material which is a molded mixture comprising a carbonaceous powder and a binder, particles of said carbonaceous powder being bound together by means of said binder with the surface of said carbonaceous powder particles being not wholly, covered with said binder.

DETAILED DESCRIPTION OF THE INVENTION

In accordance with the present invention, the molded carbonaceous material can be produced by using a latex and mixing said latex with a carbonaceous powder and shaping or molding the mixture under pressure, for example, by means of a press.

The latex includes natural, synthetic and artificial latices, as classified by the production method or formation process viewpoint.

Among them, the natural latex is a polymer emulsion formed in the nature and is a latex in the original meaning of the word.

The synthetic latex is a latex produced by emulsion polymerization. Examples are styrene-butadiene rubber (SBR), acrylonitrile-butadiene rubber (NBR), chloroprene rubber (CR), polyacrylate, polyvinyl acetate and polyvinyl chloride emulsions.

The artificial latex is also called a dispersion and may be classified among synthetic latices in the broadest meaning of the word.

The artificial latex is prepared by making up a polymer in bulk into an emulsion or dispersion. Said polymer may be either a natural one or a synthetic one.

The artificial latex includes natural rubber dispersions, regenerated rubber dispersions, stereo-regular rubber latices (e.g., isoprene rubber latex, butadiene rubber latex), and solution- or bulk-polymerized polymer latices (e.g., isobutene-isoprene rubber latex, thiokol latex, polyurethane latex, polyethylene latex, polybutene latex).

The solid content of these latices consists of particles 0.03 to 5 $\mu$m in diameter and nearly spherical in shape.

In the process of manufacturing the molded carbonaceous material according to the present invention, the latex is used as a dispersion system in which the latex particles are dispersed in water or an organic solvent. In addition, in the case of a polyvinyl chloride paste, for instance, it is a dispersion of polymer particles in a plasticizer.

The carbonaceous powder, on the other hand, is prepared in the form of a dispersion in water or some other solvent. This carbonaceous powder in a dispersion system is mixed with stirring with the separately prepared latex in another dispersion system.

Figure 1:
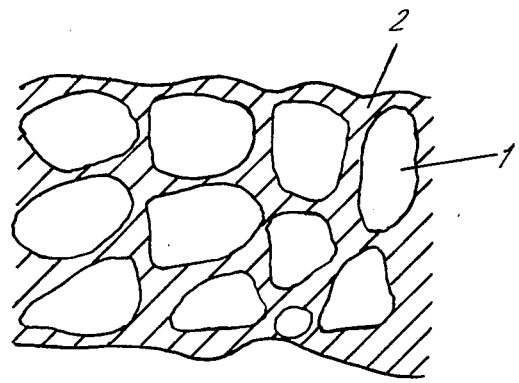
FIG. 1, already referred to, schematically illustrates the structure of prior art carbonaceous materials, and FIG. 2 schematically illustrates the structure of a carbonaceous mixture obtained in the process of manufacturing a carbonaceous material according to the present invention, 11 being a carbonaceous powder particle and 12 being a latex particle.
Figure 2:
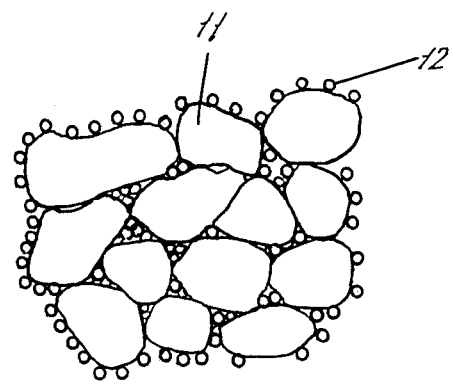

In this state of admixture, latex particles become attached to the surface of the carbonaceous powder particles and the solvent portion forms a supernatant and is separated from the carbonaceous powder. FIG. 2 is a schematic representation of the carbonaceous powder obtained at this stage of process. In the figure, 11 is a carbonaceous powder particle and 12 is a latex particle.

The excess solvent portion (residual supernatant, etc.) still attaching to the carbonaceous powder is removed by ultrafiltration or centrifugal drying and then the powder is dried upon heat to obtain a mixture in an aggregated state.

Such mixture is once ground and the ground mass is granulated. The granulated mixture is then pressure molded using a press, for instance. The molded material thus obtained has a structure more or less similar to that shown in FIG. 2 but possibly modified to a certain extent as a result of pressure molding.

Examples of the carbonaceous powder which can be used in the present invention include active carbon, graphite, acetylene black, furnace black.

In producing the molded carbonaceous material according to the present invention, the mixing amounts of the carbonaceous powder and latex are selected in the ranges of 15 to 85 weight percent and 85 to 15 weight percent, respectively. In particular, from the viewpoint of moldability, it is preferable that the carbonaceous powder and latex be used in an amount of 60 to 75 weight percent and 40 to 25 weight percent, respectively. It is to be noted, however, that an increase in the latex amount does not cause substantial changes in the conductivity of the final product. This is presumably because the latex particles are present among the carbonaceous powder particles, binding these particles in a manner such that the contact among carbonaceous powder particles be not substantially inhibited.

The molded carbonaceous material according to the present invention is in a state such that the binder resulting from the starting material latex is distributed among and binding the carbonaceous powder particles without completely covering the whole surface area of the carbonaceous powder 11, so that the surface activity of the carbonaceous powder is not damaged substantially. Therefore, the loss in the specific surface area of the carbonaceous powder is very small, and the molded carbonaceous material has a good electric conductivity and can fully exhibit the performance characteristics required of a deodorant, decoloring agent, adsorbent or catalyst carrier, for instance. Furthermore, since the pressure molding turns the powder into relatively large solid bodies, the molded carbonaceous material can be handled as such bodies with advantage. Thus, for instance, the work becomes simple and easy of placing said material in cells in the manufacture of electric double layer capacitors using said material as the polarizable electrode material.

The following example illustrates the invention in further detail.

EXAMPLE

Wood meal-derived active carbon, not greater than 74 $\mu$m (200 mesh) in particle size, was added, in an amount of 80 weight percent based on the resulting mixture, to an artificial latex (dispersion), namely, a 20 weight percent (on the solids basis) dispersion of chlorosulfonylated polyethylene in water as the dispersion medium, and the mixture was stirred well.

This mixture was subjected to dehydration treatment to thereby remove the liquid phase such as the dispersion medium, the resulting aggregate was dried, ground and further granulated. The granular powder obtained was pressure molded to give a molded carbonaceous material.

A nitrogen gas adsorption test revealed that said molded material had a specific adsorption surface area of 700 $m^2/g$ (as for the nitrogen gas adsorbed thereon). Since the carbonaceous powder itself had a specific surface area of 1,000 $m^2/g$, it is evident that the loss in the specific surface area of the molded carbonaceous material according to the present invention is small.

In addition to the above example, it was further confirmed that the use, as the binder, of other latices such as a polyvinyl acetate emulsion can give similar results.

As is evident from the above example, the molded carbonaceous material according to the present invention has the following characteristic features: a sufficient level of surface activity, which does not require a particular treatment for surface activation; smallness in the loss of specific surface area as compared with the starting carbonaceous powder; and, furthermore, a good electric conductivity value.

While the invention has been described in detail and with reference to specific embodiments thereof, it will be apparent to one skilled in the art that various changes and modifications can be made therein without departing from the spirit and scope thereof.

What is claimed is:

1. A process for producing a molded carbonaceous material, comprising the steps of
   mixing a carbonaceous powder dispersion with natural or synthetic latex dispersion selected from the group consisting of natrual rubber latex, styrenebutadiene rubber, acrylonitrilebutadiene rubber, chloroprene rubber, polyarylate, polyvinyl acetate, polyvinyl chloride emulsion, natural rubber dispersion, regenerated rubber dispersion, stereo-regular rubber lattice and solution or bulk polymerized polymer latex,
   stirring the dispersion mixture to attach the solid content of said latex as binder to the surface of the carbonaceous powder particles,
   removing the solvent portion of the stirred mixture system so as to obtain a mixture in an aggregated state, and
   molding the mixture in an aggregated state such that the particles of said carbonaceous powder are bound together by means of said binder with the surface of said carbonaceous powder being not wholly covered with said binder.

2. The process for producing a molded carbonaceous material of claim 1, wherein the mixing amounts of the carbonaceous powder and latex are 15 to 85 percent by weight and 85 to 15 percent by weight, respectively.

3. The process for producing a molded carbonaceous material of claim 2, wherein the mixing amounts of the carbonaceous powder and latex are 60 to 75 percent by weight and 40 to 25 percent by weight, respectively.

4. The process for producing a molded carbonaceous material of claim 1, wherein the mixture is molded into the form a of a polarized electrode of a electric double layer capacitor.

5. The process for producing a molded carbonaceous material of claim 1, wherein the solid content of the latex is particles of 0.03 to 5 $\mu$m in diameter.

6. The process for producing a molded carbonaceous material of claim 1, wherein the molding step is a pressure molding step.

7. The process for producing a molded carbonaceous material of claim 1, wherein the latex is a synthetic latex.

8. The process for producing a molded carbonaceous material of claim 7, wherein the synthetic latex is a styrenebutadiene rubber, acrylonitrile-butadiene rubber, chloroprene rubber, polyacrylate or polyvinyl chloride emulsion.

9. The process for producing a molded carbonaceous material of claim 7, wherein the synthetic latex is selected from the group consisting of natural rubber dispersion, regenerated rubber dispersion, stereo-regular rubber lattice and solution or bulk polymerized polymer latex.

10. The process for producing a molded carbonaceous masterial of claim 1, wherein the latex is a chlorosulfonylated polyethylene.

11. The process for producing a molded carbonaceous material of claim 1, wherein the latex is a polyvinyl acetate.

12. The process for producing a molded carbonaceous material of claim 1, wherein the mixing amounts of the carbonaceous powder and latex are 60 to 75 percent by weight and 40 to 25 percent by weight, respectively, the solid content of the lastex is pasrticles of 0.03 to 5 microns in diameter and wherein the molding step is a pressure molding step.

13. The process for producing as molded carbonaceous material of claim 12, wherein the carbonaceous powder is particles of active carbon, the latex is chlorosulfonylated polyethylene in water and wherein after removal of the solvent portion of the stirred mixture system, the mixture in an aggregated state is dried and granulated before being molded.

* * * * *